(12) United States Patent
Szafraniec (10) Patent No.: US 9,634,763 B2
(45) Date of Patent: Apr. 25, 2017

(54) TRACKING FREQUENCY CONVERSION AND NETWORK ANALYZER EMPLOYING OPTICAL MODULATION

(71) Applicant: Keysight Technologies, Inc., Minneapolis, MN (US)

(72) Inventor: Bogdan Szafraniec, Santa Clara, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/729,773

(22) Filed: Jun. 3, 2015

(65) Prior Publication Data

US 2016/0359557 A1 Dec. 8, 2016

(51) Int. Cl.
| | | |
|---|---|---|
| *H04B 17/00* | (2015.01) | |
| *H04B 10/079* | (2013.01) | |
| *H04Q 11/00* | (2006.01) | |
| *H04L 7/00* | (2006.01) | |

(52) U.S. Cl.
CPC ..... *H04B 10/07955* (2013.01); *H04B 10/079* (2013.01); *H04B 10/0793* (2013.01); *H04L 7/0075* (2013.01); *H04Q 11/0066* (2013.01); *H04Q 2011/0083* (2013.01)

(58) Field of Classification Search
CPC .......... H04B 10/07955; H04B 10/0793; H04B 10/079; H04L 7/0075; H04Q 11/0066; H04Q 2011/0083
USPC ......................................................... 398/38
See application file for complete search history.

(56) References Cited

U.S. PATENT DOCUMENTS

| | | | |
|---|---|---|---|
| 6,335,814 B1 | 1/2002 | Fuse et al. | |
| 6,487,004 B1 * | 11/2002 | Strutz ..................... | G02F 2/002 |
| | | | 359/245 |
| 6,940,638 B2 | 9/2005 | Kondoh et al. | |
| 7,460,793 B2 | 12/2008 | Taylor | |
| 7,809,222 B2 | 10/2010 | Hartl et al. | |
| 8,981,273 B2 | 3/2015 | Kuo | |

(Continued)

FOREIGN PATENT DOCUMENTS

| | | |
|---|---|---|
| CN | 104202085 A | 12/2014 |
| CN | 104216196 A | 12/2014 |

(Continued)

OTHER PUBLICATIONS

Karim, "High Dynamic Range Microwave Photonic Links for RF Signal Transport and RF-IF Conversion." Journal of Lightwave Technology, Aug. 2008, vol. 26, Issue: 15 pp. 2718-2724.*

(Continued)

*Primary Examiner* — Juan A Torres (57) ABSTRACT

Tracking frequency conversion employs optical modulation of an optical signal to convert a radio frequency (RF) signal into an intermediate frequency (IF) output signal. A tracking frequency converter includes an optical modulator configured to receive the RF signal and to modulate the optical signal according to the received RF signal. The tracking frequency converter further includes a first square-law photodetector configured to receive the modulated optical signal and another optical signal to convert the received RF signal into the IF output signal. One or both of the modulated optical signal and the other optical signal is a tunable optical signal.

20 Claims, 4 Drawing Sheets

(56) References Cited

U.S. PATENT DOCUMENTS

| | | | |
|---|---|---|---|
| 2002/0114038 A1* | 8/2002 | Arnon | H04B 10/1125 398/115 |
| 2003/0057965 A1* | 3/2003 | Toyoda | G01R 25/00 324/617 |
| 2003/0198477 A1* | 10/2003 | Kuri | H04B 10/2575 398/183 |
| 2004/0070766 A1 | 4/2004 | Szafraniec et al. | |
| 2006/0238770 A1 | 10/2006 | Szafraniec et al. | |
| 2007/0146721 A1 | 6/2007 | Barcelos et al. | |
| 2011/0229138 A1* | 9/2011 | Watanabe | G02F 2/004 398/79 |
| 2013/0202303 A1 | 8/2013 | Wilkinson et al. | |
| 2014/0070072 A1 | 3/2014 | Kuo | |
| 2015/0002920 A1 | 1/2015 | Shi | |
| 2016/0103166 A1 | 4/2016 | Szafraniec et al. | |
| 2016/0359556 A1 | 12/2016 | Szafraniec et al. | |

FOREIGN PATENT DOCUMENTS

| | | |
|---|---|---|
| DE | 102008027033 B4 | 7/2010 |
| WO | 2009127843 A1 | 10/2009 |

OTHER PUBLICATIONS

Notice of Allowance dated Oct. 5, 2016 in co-pending U.S. Appl. No. 14/729,702.

Blanc et al., "Optical Mixing Techniques", 4 pages, Nov. 26, 2014 [date downloaded by inventor Szafraniec].

Noe, et al. "Integrated-Optic Rotating Waveplate Frequency Shifter", Electronics Letters, Oct. 13, 1998, vol. 21, No. 4, p. 1348-1349.

Cheng, et al. "Baseband integrated acousto-optic frequency shifter", Appl. Phys. Lett. 60 (1), Jan. 6, 1992.

Brimrose Corporation of America, "Instructions for RF Drivers", Retrieved from the Internet: <http://www.brimrose.com/pdfandwordfiles/aofvfd.pdf>, Oct. 30, 2014 [date downloaded by inventor Szafraniec].

Lu, et al. "An Integrated Heterodyne Optical Phase-locked Loop with Record Offset Locking Frequency", Optical Fiber Communication Conference 2014, San Francisco, California United States, Mar. 9-13, 2014.

Alferness, et al. "Velocity-Matching Techniques for Integrated Optic Traveling Wave Switch/Modulators", IEEE Journal of Quantum Electronics, Vol. QE-20, No. 3, Mar. 1984.

Ip, et al. "Coherent detection in optical fiber systems", Optics Express, vol. 16, No. 2, Jan. 21, 2008.

Abbas, et al. "A Dual-Detector Optical Heterodyne Receiver for Local Oscillator Noise Suppression", Journal of Lightwave Technology, Vol. LT-3, No. 5, Oct. 1985.

Yao, "Microwave Photonics", Journal of Lightwave Technology, vol. 27, No. 3, Feb. 1, 2009.

English language translation of DE 102008027033 B4, published Jul. 8, 2010, 20 pages.

"Electrical Network Analysis Using Optical Stimulus", the IP.com Journal, vol. 13, No. 4a, p. 325-328, Apr. 2013.

Jones, "A New Calculus for the Treatment of Optical Systems. VII. Properties of the N-Matrices", Journal of the optical Society of America vol. 38, No. 8, 15 pages, Aug. 1948.

Baney, "Elementary Matrix Method for Dispersion Analysis in Optical Systems", Journal of Lightwave Technology, Vol. 28, No. 4, Feb. 15, 2010, 14 pages.

"S-Parameters Theory and Application", Hewlett-Packart Journal, Feb. 1967.

Notice of Allowance dated Feb. 2, 2017 in co-pending U.S. Appl. No. 14/729,702.

\* cited by examiner

TRACKING FREQUENCY CONVERSION AND NETWORK ANALYZER EMPLOYING OPTICAL MODULATION

CROSS-REFERENCE TO RELATED APPLICATIONS

This application is related to a co-pending U.S. patent application Ser. No. 14/729,702, filed Jun. 3, 2015, which is incorporated by reference herein in its entirety

STATEMENT REGARDING FEDERALLY SPONSORED RESEARCH OR DEVELOPMENT

N/A

BACKGROUND

Radio frequency (RF) and microwave systems often employ frequency conversion configured to track an input RF signal over a range of frequencies. For example, in a network analyzer, a local oscillator (LO) signal is often configured to track a frequency of an RF test signal to facilitate s-parameter measurements. In particular, by frequency tracking, the LO signal can be used to convert (e.g., downconvert) one or both the RF test signal and a response signal of a device under test (DUT) to a fixed intermediate frequency (IF). The fixed IF may simplify an implementation of a measurement portion or 'test set' of the network analyzer, for example, as well as support high performance characteristics of the network analyzer measurement portion.

Unfortunately, as DUT bandwidth and concomitant frequency range requirements of modern RF/microwave systems increase, a tuning range of the RF test signal and tracking LO signal must be similarly increased. However, with conventional frequency-tracking signal synthesis and the signal sources that use such synthesis (e.g., phase-locked loop RF sources) it can be difficult to achieve frequency tuning ranges sufficient to meet the needs many modern RF/microware systems.

BRIEF SUMMARY

In some embodiments of the principles described herein, a tracking frequency converter employing optical modulation is provided. The tracking frequency converter comprises an optical modulator configured to receive a radio frequency (RF) signal and to modulate an optical signal according to the received RF signal. The tracking frequency converter further comprises a first square-law photodetector configured to receive the modulated optical signal and another optical signal and to convert the RF signal into an intermediate frequency (IF) output signal having a predetermined frequency. One or both of the modulated optical signal and the other optical signal are a tunable optical signal. The tunable optical signal is configured to track a frequency of the received RF signal such that a frequency difference between a spectral component of the modulated optical signal and the other optical signal is equal to the predetermined IF frequency.

In other embodiments of the principles described herein, a network analyzer employing optical modulation-based tracking frequency conversion is provided. The network analyzer comprises a radio frequency (RF) signal source configured to generate an RF test signal to be applied to a port of a device under test (DUT). The network analyzer further comprises an optical local oscillator (LO) source configured to provide a pair of optical signals that is configured to track a frequency of the RF test signal. The optical signals of the pair have a frequency difference equal to either a sum of the RF test signal frequency and a frequency of an intermediate frequency (IF) signal or a difference between the RF test signal frequency and the frequency of the intermediate frequency (IF) signal. The network analyzer further comprises an optical modulation-based frequency converter configured to modulate an optical signal of the optical signal pair according to a received RF signal and to convert the received RF signal into the IF signal using the optical signal pair having the modulated optical signal. The received RF signal comprises one or both of the RF test signal applied to the DUT and a response signal produced by the DUT.

In other embodiments of the principles described herein, a method of tracking frequency conversion using optical modulation is provided. The method of tracking frequency conversion comprises modulating an optical signal according to a received radio frequency (RF) signal using an optical modulator. The method of tracking frequency conversion further comprises generating an intermediate frequency (IF) output signal from the modulated optical signal and another optical signal using a square-law photodetector. A frequency difference between a spectral component of the modulated optical signal and the other optical signal is equal to an intermediate frequency of the IF output signal. One or both of the modulated optical signal and the other optical signal is tunable. The IF output signal generation represents a frequency conversion of the received RF signal into the IF output signal.

BRIEF DESCRIPTION OF THE DRAWINGS

Various features of embodiments and examples in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples consistent with the principles described herein provide tracking frequency conversion using optical modulation. In particular, according to various embodiments, tracking frequency conversion employs optical modulation of an optical signal to convert a radio frequency (RF) signal into an intermediate frequency (IF) output signal. In various embodiments, the optical signal is modulated according to the RF signal. Then square-law detection is employed to produce the IF output signal as a mixing product of the modulated optical signal and another optical signal. Further, one or both of the optical signal and the other optical signal is configured to track a frequency of the RF signal across a frequency range thereof. In some embodiments, the RF signal is generated using a pair of optical signals that are tunable and one or both of the optical signals used in the tracking frequency conversion are derived from the RF signal. Further, one or more of optical signals used in the tracking frequency conversion may be derived from the optical signals pair that generates the RF signal, in some embodiments. As a result, the tracking frequency conversion using optical modulation provides the IF output signal at a substantially fixed, predetermined frequency across a tuning range of the RF signal (i.e., the IF is fixed). Application of the tracking frequency conversion includes, but is not limited to, use in a frequency converter of a network analyzer, according to some embodiments.

Herein, the term 'optical signal' is a signal having a frequency or equivalently a wavelength that is in the optical frequency or wavelength range. For example, an optical signal may be produced by an optical source such as, but not limited to, a light emitting diode or a laser (e.g., a laser diode). Further herein, the term 'optical signal' is used to distinguish the signal from other signals having much lower frequencies that may generally be classified as 'electrical' signals. So-called 'electrical signals' by definition herein may include, but are not limited to, signals having frequencies in the radio frequency (RF) range, microwave range, or millimeter wave frequency range. That is, an electrical signal may be an RF signal, a microwave signal, or a millimeter wave signal, according to various embodiments. Herein, the term 'RF' when applied to a signal is defined to include RF, microwave and millimeter wave signals for simplicity of discussion unless otherwise explicitly stated. Similarly by definition herein, the term 'intermediate frequency (IF)' is used herein to describe frequencies and signals (i.e., electrical signals) that are at a different frequency than the RF signal, especially where the different frequency is the result of a conversion of the RF signal in a frequency converter. In many cases herein, the IF signal is the result of a downconversion of the RF signal such that the IF is at a lower frequency than RF.

Further, as used herein, the article 'a' is intended to have its ordinary meaning in the patent arts, namely 'one or more'. For example, 'a signal' means one or more signals and as such, 'the signal' means 'the signal(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, herein the term 'substantially' as used herein means a majority, or almost all, or all, or an amount within a range of about 51% to about 100%. Moreover, examples herein are intended to be illustrative only and are presented for discussion purposes and not by way of limitation.

In accordance with some embodiments of the principles described herein, a tracking frequency converter is provided. The tracking frequency converter is configured to convert a radio frequency (RF) signal into an intermediate frequency (IF) output signal using optical modulation of optical signals that track a frequency of the RF signal. In particular, the tracking frequency converter is configured to modulate an optical signal according to the received RF signal. Further, a tunable optical signal is configured to insure that a frequency difference between a spectral component of the modulated optical signal and another optical signal is equal to a predetermined frequency of the IF output signal. Together, the modulated optical signal and the other optical signal are combined to facilitate square-law frequency conversion within the tracking frequency converter to convert the RF signal into the IF output signal, according to various embodiments.

Figure 1:
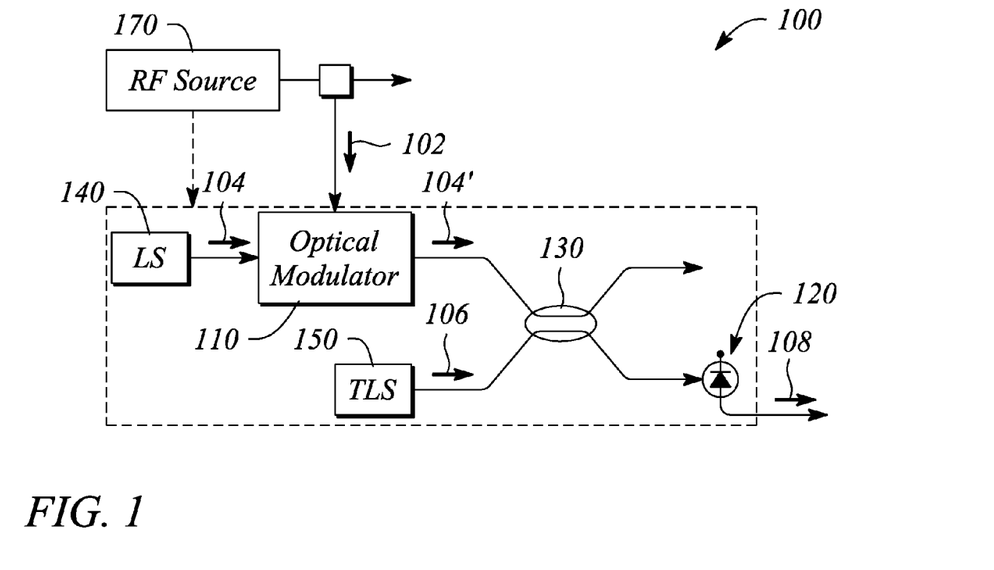
FIG. 1 illustrates a block diagram of a tracking frequency converter employing optical modulation in an example, according to an embodiment consistent with the principles described herein.

FIG. 1 illustrates a block diagram of a tracking frequency converter 100 employing optical modulation in an example, according to an embodiment consistent with the principles described herein. The tracking frequency converter 100 employing optical modulation comprises an optical modulator 110. The optical modulator 110 is configured to receive an RF signal 102 and to modulate an optical signal 104 according to the received RF signal 102 to produce a modulated optical signal 104'. According to various embodiments, any of a variety of optical modulators including, but not limited to, an electro-optic modulator configured to exploit an electro-optic effect, or a magneto-optic modulator, may be used to realize the optical modulator 110. For example, the optical modulator 110 may comprise a traveling wave optical modulator, as described below. Further, the optical modulator 110 may be a phase modulator, an intensity modulator, or a single-sideband modulator, in some embodiments.

The tracking frequency converter 100 employing optical modulation illustrated in FIG. 1 further comprises a first square-law photodetector 120. The first square-law photodetector 120 is configured to receive the modulated optical signal 104' and another optical signal 106. The first square-law photodetector 120 is further configured to convert the RF signal 102 into an IF output signal 108. The IF output signal 108 has a predetermined frequency (e.g., a predetermined 'IF frequency'). According to various embodiments, one or both of the modulated optical signal 104' and the other optical signal 106 is a tunable optical signal. In particular, the tunable optical signal is configured to track a frequency (i.e., 'RF frequency') of the received RF signal 102 such that a frequency difference between a spectral component of the modulated optical signal 104' and the other optical signal 106 is equal to the predetermined frequency of the IF output signal.

In particular, according to various embodiments, the first square-law photodetector 120 is configured to 'mix' or perform a square-law frequency conversion of the modulated optical signal 104' and the other optical signal 106 to provide the IF output signal 108 at the predetermined frequency $f_{IF}$. For example, the IF output signal 108 produced by the first square-law photodetector 120 may represent a difference (i.e., a positive difference) between optical frequencies of the modulated optical signal 104' and the other optical signal 106. In other words, the predetermined frequency $f_{IF}$ of the IF output signal 108 may be given by equation (1) as $$f_{IF} = |f_m^* - f_2| \quad (1)$$

where $f_m^*$ and $f_2$ are frequencies (or spectral components) of the modulated optical signal 104' and the other optical signal 106, respectively, and where $|\cdot|$ represents a magnitude operator. Further, for example, the optical signal 104 modulated by the RF signal 102 to become the modulated optical signal 104' may have a frequency $f_m$ before modulation given by equation (2) while the other optical signal 106 may have a frequency $f_2$ given by equation (3) as $$f_m = f_1 \pm f_{IF} \quad (2)$$

$$f_2 = f_1 \pm f_{RF} \quad (3)$$

where $f_1$ is a first optical frequency (e.g., see discussion below) and $f_{RF}$ is a frequency of the RF signal 102.

In some embodiments, the first square-law photodetector 120 may comprise a photodiode (e.g., as illustrated in FIG. 1). In other embodiments, the first square-law photodetector 120 may comprise another device that provides square-law frequency conversion or square-law detection at optical frequencies including, but not limited to, a PIN photodiode, a metal-semiconductor-metal (MIM) photodiode, a photonic transistor or a similar device that is configured to exhibit non-linearity at optical frequencies.

According to some embodiments, as illustrated in FIG. 1, the tracking frequency converter 100 employing optical modulation further comprises an optical combiner 130. The optical combiner 130 is configured to combine the modulated optical signal 104' with the other optical signal 106. The optical combiner 130 is further configured to provide the combined optical signals 104', 106 to the first square-law photodetector 120 (e.g., as illustrated in FIG. 1). In particular, the optical combiner 130 may be connected to receive the modulated optical signal 104' at a first input port and the other optical signal 106 at a second input port. Further, a first output of the optical combiner 130 may be connected to an input of the first square-law photodetector 120 (e.g., as illustrated). Various optical combiners may be used as the optical combiner 130 including, but not limited to, a fiber optic coupler, an integrated optics coupler, or a prism beam combiner. In some embodiments (not illustrated), a second output of coupler 130 may be connected to another square-law photodetector to provide another IF output signal having an opposite phase to the IF output signal 108.

According to some embodiments, the tracking frequency converter 100 employing optical modulation further comprises a laser source 140. According to various embodiments, the laser source 140 may be either tunable or fixed. As illustrated in FIG. 1 by way of example and not limitation, the laser source (LS) 140 is a fixed or substantially non-tunable laser source. The laser source 140 is configured to provide the optical signal 104 to the optical modulator 110. According to some embodiments, the optical signal 104 provided to the optical modulator 110 by the laser source 140 has an optical frequency equal to a first optical frequency (e.g., $f_1$ above) minus the predetermined frequency $f_{IF}$. In other embodiments, the optical signal 104 provided to the optical modulator 110 by the laser source 140 has an optical frequency equal to the first optical frequency (e.g., $f_1$) plus the predetermined frequency $f_{IF}$. In other words, the laser source 140 may provide the optical signal 104 having an optical frequency $f_m$ given by equation (2) above. Further, the optical signal 104 may originate from another optical component, such as a frequency shifter, that operates on the frequency of the laser source contained in the RF source 170, as described below.

Further, according to some embodiments, the tracking frequency converter 100 employing optical modulation further comprises another laser source 150 that is either tunable or fixed. As illustrated in FIG. 1 by way of example and not limitation, the other laser source 150 is a tunable laser source (TLS) 150. The tunable laser source 150 is configured to provide the other optical signal 106 as the tunable optical signal. In some embodiments, the other optical signal 106 as the tunable optical signal has an optical frequency equal to a sum of the first optical frequency (e.g., $f_1$) and the received RF signal frequency, e.g., $f_{RF}$. In other embodiments, the other optical signal 106 as the tunable optical signal has an optical frequency equal to a difference of the first optical frequency (e.g., $f_1$) and the received RF signal frequency $f_{RF}$. In other words, the tunable laser source 150 may provide the other optical signal 106 having a tunable optical frequency $f_2$ given by equation (3) above. Further, the optical signal 106 may originate from a laser source contained in the RF source 170, as described below.

According to some embodiments, the tracking frequency converter 100 employing optical modulation further comprises an RF source 170 configured to provide the RF signal 102 or another RF signal from which the RF signal 102 is derived (e.g., as a response to the signal provided by the RF source 170). The RF source 170 may further provide a tracking signal connection to facilitate RF signal tracking by the tracking frequency converter 100, for example. A dashed arrow extending from the RF source 170 to another portion of the tracking frequency converter 100 surrounded by a dashed line illustrates the tracking signal connection. For example, the tracking signal connection may indicate that the signals 104 and 106 may be derived from the lasers sources contained in the RF source 170, as described below.

In some embodiments, the RF source 170 may be an optical signal-based RF source 170. According to some embodiments, one or both of the optical signal 104 and the other optical signal 106 may be derived from an optical signal or signals of the optical signal-based RF source 170. In particular, according to some embodiments, one or both of the laser source 140 and the tunable laser source 150 may be either replaced or substantially provided by the optical signal-based RF source 170, as is described in more detail below with reference to FIGS. 4A and 4B.

According to some embodiments, the RF signal 102 may be used to test a device under test (DUT). For example, the RF source 170 may be part of a network analyzer used to test the DUT, e.g., as described below. A box illustrated at an output of the RF source 170 in FIG. 1 may represent a test set of the network analyzer, for example. As such, the RF signal 102 may be one or both of the RF signal produced by the RF source 170 or a response signal received from the DUT, e.g., where the response signal is responsive to or derived from the RF signal provided by the RF source 170, according to various embodiments.

Figure 2:
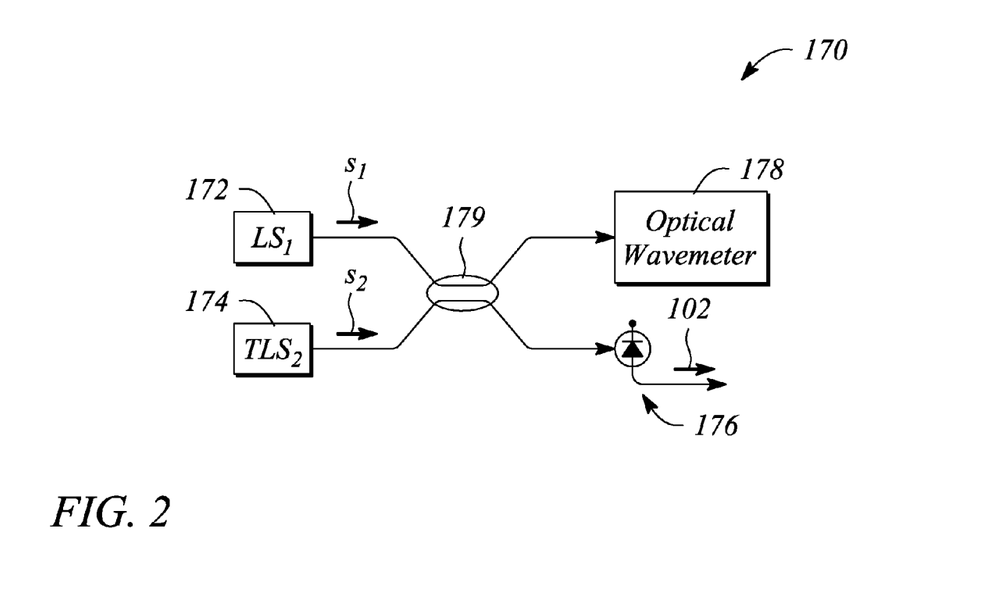
FIG. 2 illustrates block diagram of an optical signal-based radio frequency (RF) source in an example, according to an embodiment consistent with the principles described herein.

FIG. 2 illustrates a block diagram of an optical signal-based RF source 170 in an example, according to an embodiment consistent with the principles described herein.

As illustrated in FIG. 2, the optical signal-based RF source 170 comprises a first laser source 172 ($LS_1$). The first laser source 172 is configured to provide a first optical signal having a first optical frequency. For example, the first optical signal provided by the first laser source 172 may have a first optical frequency equal to the first optical frequency $f_1$, as described above. In FIG. 2, a bold arrow labeled 's1' illustrates the first optical signal provided by the first laser source 172.

Also illustrated in FIG. 2, the optical signal-based RF source 170 further comprises a second laser source 174 that is tunable ($TLS_2$). The tunable second laser source 174 is configured to provide a second optical signal having a second optical frequency that is tunable. In particular, the tunable second optical signal may have a predetermined tuning range, according to various embodiments. In some examples, the tunable second optical signal may have a tunable second optical frequency equal to the second optical frequency $f_2$, as described above. In FIG. 2, the tunable second optical signal is illustrated using a bold arrow labeled '$s_2$'.

In some examples, the optical signal 104 may be derived from the first optical signal provided by the first laser source 172. As such, the laser source 140 may comprise the first laser source 172 or may be derived from the laser source 172, in some embodiments. Further, in some examples, the tunable second optical signal may be employed as the other optical signal 106, described above. As such, the tunable laser source 150 may comprise the tunable second laser source 174, in some embodiments.

The optical signal-based RF source 170 illustrated in FIG. 2 further comprises a second square-law photodetector 176. According to various embodiments, the second square-law photodetector 176 of the optical signal-based RF source 170 is an additional square-law photodetector that is separate from the first square-law photodetector 120, described above. The second square-law photodetector 176 is configured to generate the RF signal 102. In particular, the generated RF signal 102 has a frequency equal to a frequency difference between the first optical frequency and the tunable second optical frequency, according to various embodiments. The additional or second square-law photodetector 176 may be substantially similar to the first square-law photodetector 120 described above. For example, the second square-law photodetector 176 may comprise a photodiode, e.g., as illustrated in FIG. 2.

The optical signal-based RF source 170 further comprises an optical wavemeter 178. The optical wavemeter 178 is configured to determine a frequency difference between the frequencies of the first optical signal $s_1$ and the tunable second optical signal $s_2$. According to various embodiments, the determined frequency difference provides a measurement of the frequency $f_{RF}$ of the RF signal 102. In some embodiments, the optical wavemeter 178 may comprise an optical interferometer.

Figure 3:
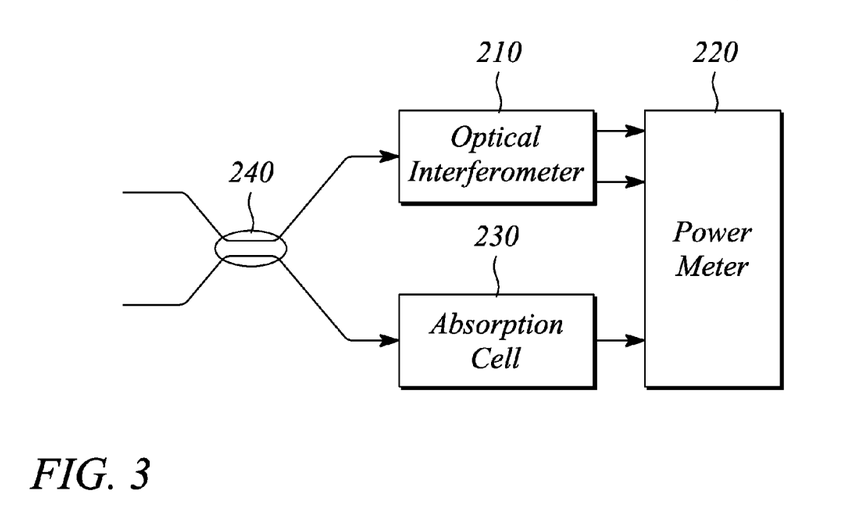
FIG. 3 illustrates a block diagram of an optical wavemeter in an example, according to an embodiment consistent with the principles described herein.

FIG. 3 illustrates a block diagram of an optical wavemeter 200 in an example, according to an embodiment consistent with the principles described herein. In particular, the optical wavemeter 200 is an example of a variety of different optical wavemeters that may be employed with the optical signal-based RF source 170 as the optical wavemeter 178. As illustrated in FIG. 3, the optical wavemeter 200 comprises an optical interferometer 210. The optical interferometer 210 may include a Michelson interferometer or a Mach-Zehnder interferometer, for example. The optical interferometer 210 is configured to receive a pair of optical signals. The pair of optical signals may comprise the first optical signal combined with the tunable second optical signal (e.g., $s_1$ and $s_2$), for example.

The optical wavemeter 200 illustrated in FIG. 3 further comprises a power meter 220. The power meter 220 is configured to receive outputs (e.g., variably delayed and combined optical signals) from the optical interferometer 210. From optical power measurements of the optical interferometer outputs, the power meter 220 is configured to determine relative frequencies or a frequency difference between the frequencies of the optical signals within the received pair of optical signals. The relative frequencies or frequency difference may provide a measurement of the frequency of the RF signal 102 generated by the optical signal-based RF source 170, according to various embodiments.

In some embodiments (e.g., as illustrated in FIG. 3), the optical wavemeter 200 may further comprise an absorption cell 230. The absorption cell 230 is configured to receive the pair of optical signals. In turn, the power meter 220 is further configured to receive an output of the absorption cell 230. In other embodiments (not illustrated), an absorption cell may not be included and the pair of optical signals may be directly provided to power meter 220.

When the absorption cell 230 is present, the power meter 220 may be configured to estimate an absolute frequency of one or both of the optical signals of the received optical signal pair from a measured power of the absorption cell output. In particular, a disturbance in the measured power of the output of the absorption cell 230 (or in the measured power of the received optical signal pair if absorption cell 230 is not used) as measured by the power meter 220 may serve as a marker to indicate when frequencies of the optical signals in the received pair are substantially equal. Further, if one of the optical signals of the received pair is tuned in frequency relative to the other, the marker may be used to establish when the frequencies of the optical signals start to move away from one another during frequency tuning of the optical signals. As described above with respect to the optical interferometer 210, the received optical signal pair may comprise the first optical signal combined with the tunable second optical signal (e.g., $s_1$ and $s_2$).

As illustrated in FIG. 3, the optical wavemeter 200 may further comprise an optical coupler 240 configured to couple the received optical signal pair into separate outputs, one output being connected to the optical interferometer 210 and another output being connected to the absorption cell 230 (or directly to power meter 220 when the absorption cell 230 is not employed). The optical coupler 240 may comprise a fiber optic coupler (e.g., a 2×2 single mode fiber optic coupler), for example.

According to various embodiments, the frequency (e.g., relative frequency) of one or both of the optical signals $s_1$ and $s_2$ may be estimated based on the power variation of the outputs of the optical interferometer 210. Further, the optical signals $s_1$ and $s_2$ can be distinguished from each other by a unique characteristic, for example, by a tuning speed, or a unique modulation. For example, at a constant tuning speed of the second optical signal $s_2$, sinusoidal variations of power may be observed at the outputs of the optical interferometer 210. A frequency of the sinusoidal fluctuations depends on the tuning speed and on a known or predetermined free spectral range (FSR) of the optical interferometer 210. When both of the optical signals $s_1$ and $s_2$ are tuned, but at different speeds (e.g., the first optical signal is tuned at a slower rate than the second optical signal), variations of power at two different frequencies appear at the outputs of the optical interferometer 210. Thus, the optical signals $s_1$ and $s_2$ may be separated based on the frequency of power fluctuation observed (e.g., by the power meter 220) at the optical interferometer outputs and each can be measured independently by counting cycles and fractional cycles of power fluctuations at two different frequencies. On the other hand, when only one signal (e.g. the second optical signal $s_2$) is tuned, the corresponding power fluctuations may be observed to estimate the frequency of the tuned optical signal. Thus, the optical signals $s_1$ and $s_2$ may be distinguished from each other based on their tuning speed and further may be independently measured, according to various embodiments.

In other embodiments, the optical signals $s_1$ and $s_2$ may be independently measured based on another unique characteristic that distinguishes the optical signals $s_1$ and $s_2$ such as, for example, an additional modulation applied to optical signals $s_1$ and $s_2$. In some embodiments (not illustrated), the optical signals $s_1$ and $s_2$ may be separately provided to a Mach-Zehnder optical interferometer 210 from opposite sides and further be output at opposite sides. Thus, the optical signals $s_1$ and $s_2$ may be separated from each other by a direction of propagation. Simultaneous measurement of the optical signals $s_1$ and $s_2$ in the same optical interferometer 210 provides a means for measuring their relative frequencies even in the presence of optical interferometer instabilities and drift, according to various embodiments.

Referring again to FIG. 2, the optical signal-based RF source 170 may further comprise an optical combiner 179, according to some embodiments (e.g., as illustrated). The optical combiner 179 is configured to combine the first optical signal from the first laser source 172 with the tunable second optical signal from the tunable second laser source 174. The optical combiner 179 is further configured to provide the combined optical signals to the second square-law photodetector 176 and the optical wavemeter 178 (e.g., as illustrated in FIG. 2). In particular, the optical combiner 179 may be connected to the first laser source 172 at a first input port and to the tunable second laser source 174 at a second input port. Further, a first output of the optical combiner 179 may be connected to an input of the second square-law photodetector 176 (e.g., as illustrated). Further as illustrated, a second output of the optical combiner 179 may be connected to an input of the optical wavemeter 178, for example. Various optical combiners may be used as the optical combiner 179 including, but not limited to, a fiber optic coupler, an integrated optics combiner, or prism beam combiner.

In some embodiments, the tracking frequency converter 100 employing the optical signal-based RF source 170 (e.g., the optical signal-based RF source as illustrated in FIG. 2) is configured to derive, one or both of the optical signal 104 and the other optical signal 106 respectively from one or both of the first optical signal and the tunable second optical signal of the optical signal-based RF source 170. In some embodiments, the optical signals 104, 106 are derived by applying a predetermined frequency shift to one or both of the first optical signal and the second optical signal using a frequency shifter. In other embodiments, a frequency offset-locked laser source is employed to provide an optical signal having the predetermined frequency shift.

Figure 4A:
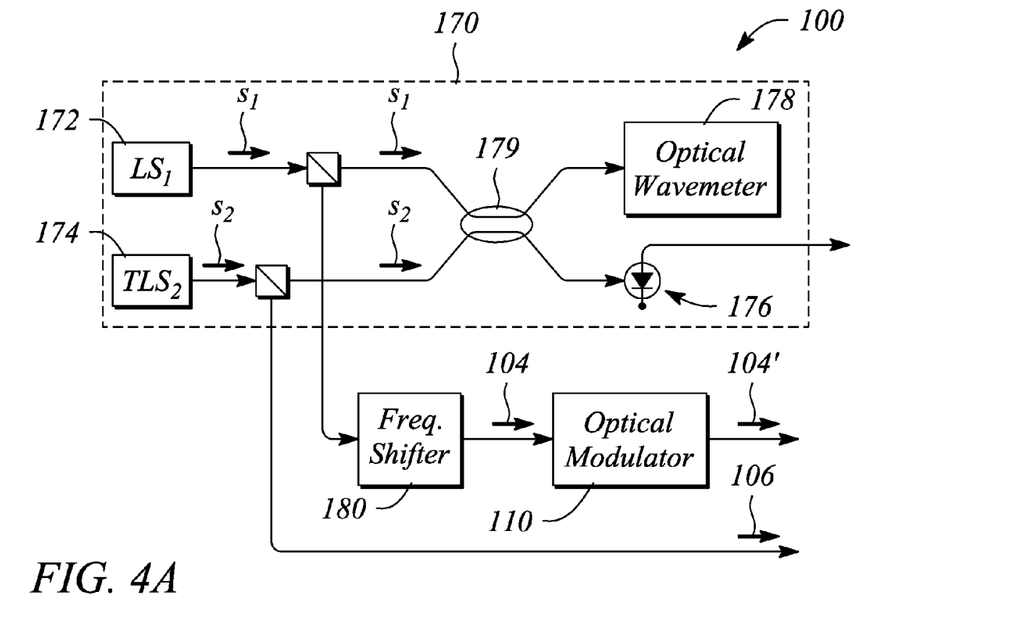
FIG. 4A illustrates a block diagram of a portion of a tracking frequency converter having optical signals derived from an optical signal-based RF source in an example, according to an embodiment consistent with the principles described herein.
Figure 4B:
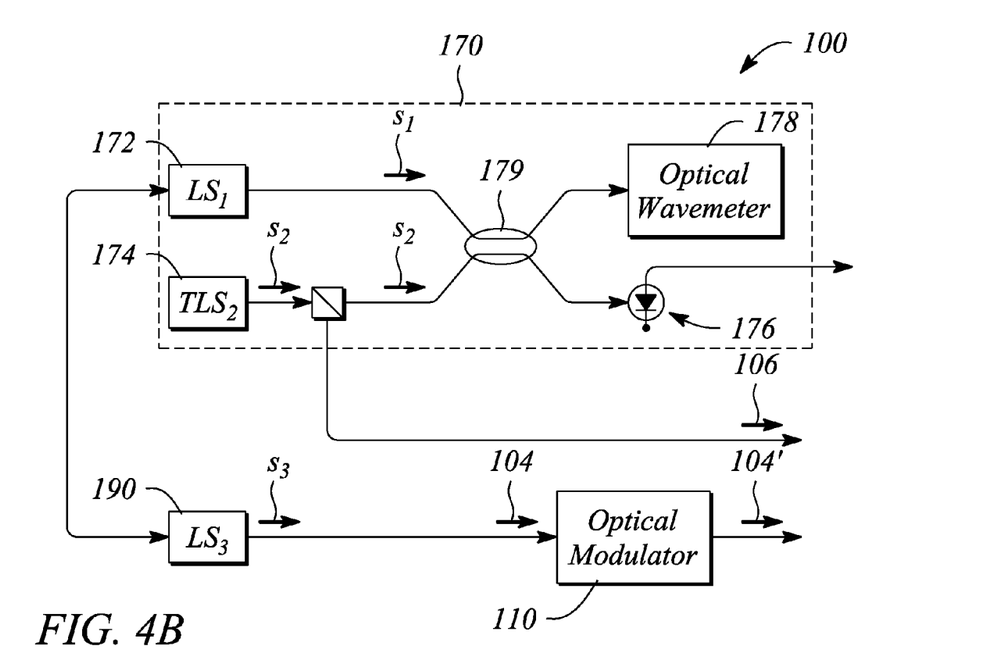
FIG. 4B illustrates a block diagram of a portion of a tracking frequency converter having optical signals derived from an optical signal-based RF source in an example, according to another embodiment consistent with the principles described herein.

FIG. 4A illustrates a block diagram of a portion of a tracking frequency converter 100 having optical signals derived from an optical signal-based RF source 170 in an example, according to an embodiment consistent with the principles described herein. FIG. 4B illustrates a block diagram of a portion of a tracking frequency converter 100 having optical signals derived from an optical signal-based RF source 170 in an example, according to another embodiment consistent with the principles described herein. In particular, the portions of the tracking frequency converter 100 illustrated in FIGS. 4A and 4B comprise the optical signal-based RF source 170 of FIG. 2 along with the optical modulator 110 illustrated in FIG. 1 to provide the optical signals 104', 106. Other elements (e.g., the first square-law photodetector 120, etc.) of the tracking frequency converter 100 illustrated in FIG. 1 are omitted for simplicity of illustration in FIGS. 4A and 4B.

In FIG. 4A, the tracking frequency converter 100 employing optical modulation further comprises a frequency shifter 180 configured to apply a predetermined frequency shift. In various embodiments, the frequency shifter 180 may be connected to apply the predetermined frequency shift to one or both of the first optical signal and the second optical signal to provide a frequency-shifted pair of optical signals. In particular, FIG. 4A illustrates the frequency shifter 180 connected to apply the predetermined frequency shift to the first optical signal by way of example, as further described below. In some embodiments, a frequency difference between frequencies of the optical signals of the frequency-shifted pair is equal to a sum of the RF signal frequency and the IF output signal frequency. In other embodiments, the frequency difference is equal to a difference between the RF signal frequency and the IF output signal frequency. Moreover, one of the optical signals of the frequency-shifted pair of optical signals is the optical signal 104 modulated according to the RF signal 102 by the optical modulator 110 to provide the modulated optical signal 104' and another optical signal of the frequency-shifted pair of optical signals is the other optical signal 106 that together with the modulated optical signal 104' are configured to be received by the first square-law photodetector 120 to convert the RF signal 102 into the IF output signal 108 (e.g., as illustrated in FIG. 1).

As illustrated in FIG. 4A, the frequency shifter 180 is located between the first laser source 172 ($LS_1$) and the optical modulator 110, by way of example and not limitation. As such, an output of the frequency shifter 180 is the optical signal 104 having the predetermined frequency shift is then modulated in the optical modulator 110. An output of the tunable second laser source 174 becomes the other optical signal 106, as illustrated in FIG. 4A. In other embodiments (not illustrated), the frequency shifter may be connected to an output of the tunable second laser source 174 ($LS_2$) to receive and apply the predetermined frequency shift to the tunable second optical signal. In yet another embodiment (not illustrated), the frequency shifter 180 may be connected to the outputs of both laser sources 172, 174 and the predetermined frequency shift may be applied, for example in a combined manner, to both the first optical signal and the second optical signal.

According to various embodiments, any of a variety of different frequency shifters may be used as the frequency shifter 180. For example, the frequency shifter 180 may comprise a nested Mach-Zehnder frequency shifter. The nested Mach-Zehnder frequency shifter may operate as a single sideband modulator to apply the predetermined frequency shift, for example. In other examples, the frequency shifter 180 may comprise another frequency shifter including, but not limited to, a spinning half-wave plate or an acousto-optic frequency shifter.

With respect to the embodiment illustrated in FIG. 4B, a predetermined frequency shift is provided by a frequency-offset locked laser source 190. In particular, as illustrated in FIG. 4B, the tracking frequency converter 100 further comprises a third laser source 190 (LS₃). The third laser source 190 has a frequency-offset lock to the first laser source 172 of the optical signal-based RF source 170 (illustrated as a double-headed arrow connecting between the first laser source 172 and the third laser source 190, for example). The third laser source 190 is configured to provide a third optical signal (illustrated by a bold arrow labeled 's₃') that is a frequency-shifted version of the first optical signal produced by the first laser source 172. In particular, the third optical signal includes a predetermined frequency shift relative to the frequency of the first optical signal, wherein the predetermined frequency shift is equal to the IF output signal frequency. As illustrated in FIG. 4B, the third optical signal is the optical signal 104 that is modulated in the optical modulator 110 to be modulated optical signal 104'. Moreover, the tunable second optical signal from the tunable laser source 174 is the other optical signal 106. These optical signals are combined and received by the first square-law photodetector 120 to provide the IF output signal 108 (e.g., as illustrated in FIG. 1), according to various embodiments.

Figure 5:
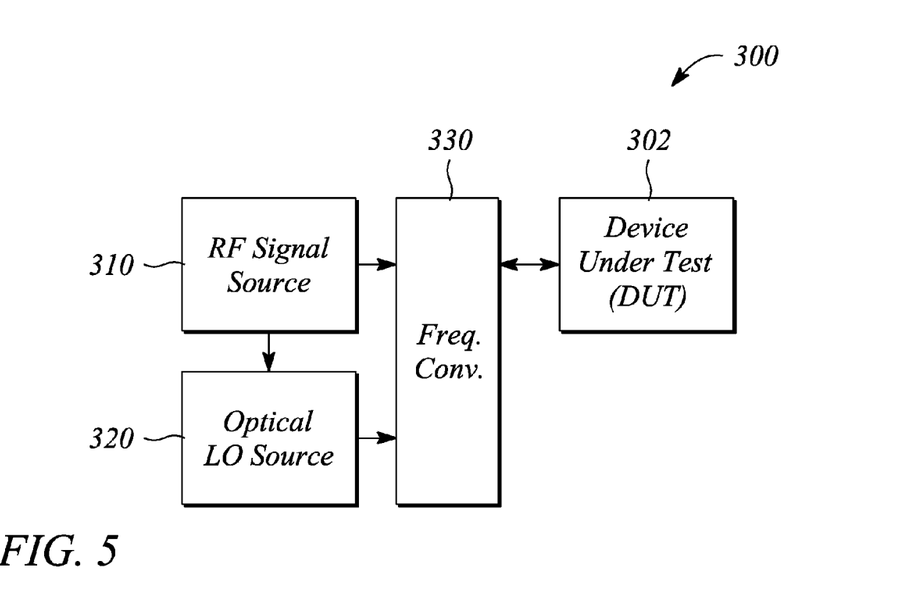
FIG. 5 illustrates a block diagram of a network analyzer employing optical modulation-based tracking frequency conversion in an example, according to an embodiment of the principles described herein.

In some embodiments according to the principles described herein, a network analyzer is provided. In particular, the provided network analyzer has or employs optical modulation-based tracking frequency conversion, according to various embodiments. FIG. 5 illustrates a block diagram of a network analyzer 300 employing optical modulation-based tracking frequency conversion in an example, according to an embodiment of the principles described herein. According to various embodiments, the network analyzer 300 may be employed to test a device under test (DUT) 302. For example, the network analyzer 300 may be used to determine s-parameters of the DUT 302.

In particular, the network analyzer 300 is configured to apply an RF test signal to ports of the DUT 302. For example, the RF test signal may be applied through or using a test set, for example. Further, the test set may monitor the RF test signal applied to the DUT 302 and a response from the DUT 302, for example. In some embodiments, the optical modulator 110 may be part of the test set. Moreover, the optical modulator 110 may be used as a coupler (e.g., a directional coupler) of the test set, in some embodiments.

According to various embodiments, optical modulation-based tracking frequency conversion is used by the network analyzer 300 to downconvert for analysis one or both of the applied RF test signal and the response signal from or produced by DUT 302. In some examples, the response signal is a signal reflected by the DUT 302 (e.g., used to determine a reflection coefficient or $s_{11}$ s-parameter). In other examples, the response signal is a signal transmitted through the DUT 302 (e.g., used to determine a transmission coefficient or $s_{21}$ s-parameter). The optical modulation-based tracking frequency conversion is configured to track a frequency of the RF test signal with a frequency offset equal to an intermediate frequency (IF) of the network analyzer 300, according to various embodiments.

As illustrated in FIG. 5, the network analyzer 300 employing optical modulation-based tracking frequency conversion comprises a radio frequency (RF) signal source 310. The RF signal source 310 is configured to generate the RF test signal that is to be applied to a port of the DUT 302. According to some embodiments, the RF signal source 310 may be substantially similar to the RF source 170 described above with respect to the tracking frequency converter 100. For example, the RF signal source 310 may be substantially similar to any of the embodiments of the optical signal-based RF source 170 described above.

In particular, in some embodiments, the RF signal source 310 may comprise a first laser source and a tunable second laser source. According to some embodiments, the first laser source and the tunable second laser source may be substantially similar respectively to the first laser source 172 and the tunable second laser source 174 of the optical signal-based RF source 170, described above. Specifically, the first laser source may be configured to provide a first optical signal having a first optical frequency and the tunable second laser source may be configured to provide a tunable second optical signal having a second optical frequency that is tunable.

Further, the RF signal source 310 may comprise a square-law photodetector. In some embodiments, the square-law photodetector of the RF signal source 310 may be substantially similar to the second square-law photodetector 176 of the above-described optical signal-based RF source 170. The square-law photodetector may be configured to provide the RF test signal having a frequency (RF frequency) that is a frequency difference between the first optical frequency and the tunable second optical frequency.

In some embodiments, the RF source 310 further comprises an optical wavemeter configured to determine the frequency of the RF test signal from one or both of the first optical signal and the second optical signal. In some embodiments, the optical wavemeter is substantially similar to the optical wavemeter 178 described above with respect to the optical signal-based RF source 170 of the tracking frequency converter 100. For example, the optical wavemeter may be substantially similar to the optical wavemeter 200 described above with respect to FIG. 3.

The network analyzer 300 employing optical modulation-based tracking frequency conversion illustrated in FIG. 5 further comprises an optical local oscillator (LO) source 320. The optical LO source 320 is configured to provide a pair of optical signals that is configured to track a frequency of the RF test signal. According to some embodiments, the optical signals of the pair have a frequency difference equal to a sum of the RF test signal frequency and an intermediate frequency (IF). In other embodiments, the frequency difference of the optical signal pair is equal to a difference between the RF test signal frequency and an intermediate frequency (IF) (e.g., of an IF signal of the network analyzer 300). In particular, the optical signals of the pair may be substantially similar to the optical signals 104, 106 described above with respect to the tracking frequency converter 100. Moreover, one or both of the optical signals of the pair may be derived from respective one or both of the first optical signal and the tunable second optical signal of the RF signal source 310, according to some embodiments. For example, the optical signal pair may be derived through the application of a frequency shift to one or both of the RF source optical signals, as described above with respect to FIGS. 4A and 4B.

In particular, in some embodiments, the optical LO source 320 comprises a frequency shifter configured to apply a predetermined frequency shift to the first optical signal of the first laser source of the RF signal source 310. The frequency-shifted first optical signal may be one of the optical signals of the pair of optical signals provided by the optical LO source 320, for example. The predetermined frequency shift is configured to provide the frequency difference of the optical signal pair, which may be equal to the sum of the RF test signal frequency and the intermediate frequency or the difference of the RF test signal frequency and the intermediate frequency, wherein the intermediate frequency is also referred to as the 'IF frequency' herein.

The frequency shifter may be substantially similar to the frequency shifter 180 described above with respect to the tracking frequency converter 100, in some embodiments. For example, the frequency shifter may be any of a variety of frequency shifters including, but not limited to, a nested Mach-Zehnder frequency shifter, a spinning half-wave plate or an acousto-optic frequency shifter. Further, the frequency shifter may be connected to the RF signal source 310 as illustrated in FIG. 4A, for example.

In other embodiments, the optical LO source 320 comprises a third laser source that is frequency-offset locked to the first laser source. The frequency-offset locked third laser source is configured to provide a third optical signal that is a frequency-shifted version of the first optical signal. In particular, the frequency-offset lock of the third laser source is configured to provide a predetermined frequency shift of the third optical signal relative to the first optical signal that is equal to the IF signal frequency. According to various embodiments, the third optical signal and the tunable second optical signal are the optical signals of the optical signal pair provided by the optical LO source 320. For example, the frequency-offset locked third laser source of the optical LO source 320 may be substantially similar to the third laser source 190 (LS$_3$) of the tracking frequency converter 100 described above and illustrated in FIG. 4B, according to some embodiments.

Referring again to FIG. 5, the network analyzer 300 employing optical modulation-based frequency conversion further comprises a frequency converter 330. The frequency converter 330 may represent or comprise the test set, for example. In particular, the frequency converter 330 is an optical modulation-based frequency converter 330, according to various embodiments. The optical modulation-based frequency converter 330 converts a received RF signal into the IF signal. In particular, the optical modulation-based frequency converter 330 is configured to modulate an optical signal of the optical signal pair according to the received RF signal and to convert the received RF signal into the IF signal using the optical signal pair having the modulated optical signal According to various embodiments, the received RF signal comprises one or both of the RF test signal applied to the DUT 302 and a response signal produced by the DUT 302. As mentioned above, the response signal may be one or both of a signal reflected by the DUT 302 and a signal transmitted through the DUT 302. Further, in either case, the response signal is responsive to the RF test signal applied to the DUT 302. In particular, the reflected signal may comprise a portion of the applied RF test signal that is reflected at a port of the DUT 302 and the transmitted signal may comprise a portion of the applied RF test signal that is transmitted through the DUT 302 from an input port another port thereof.

According to some embodiments, the RF test signal may be applied to the DUT 320 by the optical modulator 110. For example, the optical modulator 110 may serve as one or both of a monitor of the applied RF test signal and a monitor of the response signal. In particular, optical modulator 110 may be used to selectively monitor either the applied RF test signal or a reflected signal from the DUT 320. In this embodiment, the optical modulator 110 may act as a directional coupler (e.g., of the test set) in addition to being a part of a frequency converter 330.

According to some embodiments, the optical modulation-based frequency converter 330 comprises an optical modulator and a square-law photodetector. The optical modulator is configured to modulate the optical signal of the optical signal pair according to the received RF signal. The received RF signal may be received at an RF input port of the optical modulator and the optical signal may be received at an optical input port of the optical modulator. The square-law photodetector is configured to provide the IF signal having a frequency that is a frequency difference between a spectral component of the modulated optical signal and another optical signal of the optical signal pair.

For example, the frequency shifter of the optical LO source 320 may be connected between the first laser source of the RF signal source 310 and the optical input of the optical modulator of the optical modulation-based frequency converter 330. As such, the optical modulator is configured to modulate a frequency-shifted version of the first optical signal of the RF signal source 310 according to the received RF signal. In another example, the optical modulator is connected to receive the third optical signal provided by the frequency-offset locked third laser source and to modulate the third optical signal according to the received RF signal. In yet another example, the optical modulator may be connected to directly receive (i.e., without a frequency shift) and modulate one of the first optical signal and the tunable second optical signal from the RF signal source 310 or even another optical signal from another source.

According to some embodiments, the optical modulator may be substantially similar to the optical modulator 110 of the tracking frequency converter 100, described above. For example, the optical modulator of the optical modulation-based frequency converter 330 may comprise any of a variety of optical modulators including, but not limited to, an electro-optic modulator configured to exploit an electro-optic effect, or a magneto-optic modulator. Further, the modulator may be a phase modulator, an intensity modulator, or a single-sideband modulator. Further, according to some embodiments, the square-law photodetector of the optical modulation-based frequency converter 330 may be substantially similar to the first square-law photodetector 120 described above with respect to the tracking frequency converter 100.

In some examples, the directional optical modulator may have two RF ports. The first port may be used to receive the signal from the RF source and the second RF port may be used to apply the RF test signal to the DUT 302. The optical signal 104 may co-propagate with the RF signal, or it may propagate in the opposite direction. Depending on the arrangement, the optical modulator may monitor the applied RF test signal or the response signal (e.g., reflected signal).

In some embodiments, the optical modulator of the optical modulation-based frequency converter 330 comprises a directional optical modulator. The directional optical modulator is configured to separate the RF test signal applied to the DUT port from the response signal produced by the DUT 302 at the DUT port (e.g., a portion of the RF test signal reflected at the DUT port). The directional optical modulator is further configured to selectively employ one of the applied RF test signal and the DUT response signal as the received RF signal used to modulate the optical signal of the optical signal pair. For example, the directional optical modulator may be a traveling wave optical modulator. In other examples, the optical modulator may comprise another kind of a directional optical modulator.

In other embodiments, the network analyzer 300 further comprises a directional coupler (e.g., an RF directional coupler) to separate the applied RF test signal from the DUT response signal and to selectively direct the separated signal to the RF input port of the optical modulator as the received RF signal for optical signal modulation. The RF directional coupler may be part of a network analyzer test set (e.g., the test set mentioned above), for example. As such, the optical modulator may be a substantially non-directional optical modulator in some embodiments. In these embodiments, the optical modulator is not used as a part of the test set used to apply the RF test signal to the DUT 302 or to receive the response signal from the DUT 302. In some embodiments, the network analyzer 300 may contain multiple optical LO sources and multiple frequency converters to enable simultaneous measurement of several parameters, for example, several s-parameters.

Figure 6:
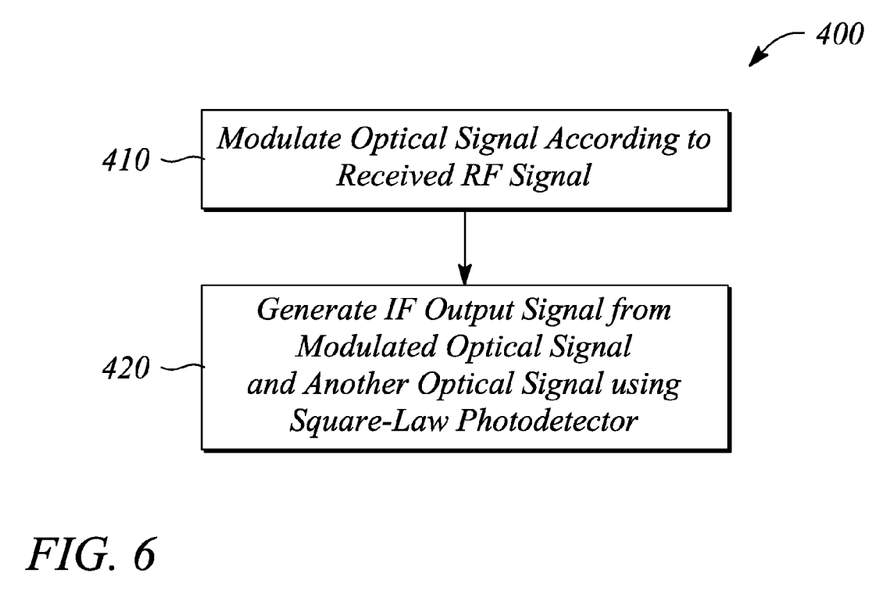
FIG. 6 illustrates a flow chart of a method of tracking frequency conversion using optical modulation in an example, according to an embodiment of the principles described herein.

In some embodiments according to the principles described herein, a method of tracking frequency conversion using optical modulation is provided. FIG. 6 illustrates a flow chart of a method 400 of tracking frequency conversion using optical modulation in an example, according to an embodiment of the principles described herein. As illustrated in FIG. 6, the method 400 of tracking frequency conversion comprises modulating 410 an optical signal according to a received radio frequency (RF) signal using an optical modulator. According to some embodiments, the optical modulator used in modulating 410 an optical signal may be substantially similar to the optical modulator 110 described above with respect to the tracking frequency converter 100. Further, in some embodiments, the modulated optical signal produced by modulating 410 may be substantially similar to the modulated optical signal 104', also described above.

The method 400 of tracking frequency conversion illustrated in FIG. 6 further comprises generating 420 an intermediate frequency (IF) output signal from the modulated optical signal and another optical signal using a square-law photodetector. A frequency difference between a spectral component of the modulated optical signal and the other optical signal is equal to an intermediate frequency of the IF output signal. Further, one or both of the modulated optical signal and the other optical signal may be tunable. According to various embodiments, the IF output signal generation 420 represents a frequency conversion of the received RF signal into the IF output signal. In some embodiments, the square-law photodetector may be substantially similar to the first square-law photodetector 120 described above with respect to the tracking frequency converter 100.

According to some embodiments (not illustrated), the method 400 of tracking frequency conversion further comprises producing the optical signal using a laser source prior to modulating 410. The optical signal may have an optical frequency equal to a first optical frequency minus or plus the intermediate frequency of the IF output signal. According to some embodiments (not illustrated), the method 400 of tracking frequency conversion further comprises producing the other optical signal using a tunable second laser source. The other optical signal may have a tunable optical frequency equal to either a sum or a difference of the first optical frequency and a frequency of the received RF signal.

According to some embodiments, the method 400 of tracking frequency conversion may be employed to test a device under test (DUT), e.g., in a network analyzer. According to these embodiments (not illustrated), the method 400 of tracking frequency conversion may further comprise applying an RF test signal to a port of the DUT. The method 400 of tracking frequency conversion may further comprise receiving one of the applied RF test signal and a response signal produced by the DUT as the received RF signal used in modulating 410 the optical signal. According to various embodiments, receiving a respective one of the applied RF test signal and the DUT response signal may comprise separating the applied RF test signal and the DUT response signal from one another. For example, the applied RF test signal and the DUT response signal may be separated using a directional coupler. In another example, the optical modulator comprising a directional optical modulator may be used to separate the applied RF test signal and the response signal from the DUT.

Thus, there have been described examples and embodiments of a tracking frequency converter, a network analyzer and a method of tracking frequency conversion that employ optical modulation to convert an RF signal into an IF signal. It should be understood that the above-described examples are merely illustrative of some of the many specific embodiments and examples that represent the principles described herein. Clearly, those skilled in the art can readily devise numerous other arrangements without departing from the scope as defined by the following claims.

What is claimed is:

1. A tracking frequency converter employing optical modulation comprising:
    an optical modulator configured to receive a radio frequency (RF) signal and to modulate an optical signal according to the received RF signal; and
    a first square-law photodetector configured to receive the modulated optical signal and another optical signal to convert the received RF signal into an intermediate frequency (IF) output signal having a predetermined frequency, one or both of the modulated optical signal and the other optical signal being a tunable optical signal,
    wherein the tunable optical signal is configured to track a frequency of the received RF signal such that a frequency difference between a spectral component of the modulated optical signal and the other optical signal is equal to the predetermined frequency of the IF output signal.

2. The tracking frequency converter of claim 1, further comprising an optical combiner to combine the modulated optical signal with the other optical signal and to provide the combined optical signals to the first square-law photodetector.

3. The tracking frequency converter of claim 1, further comprising:
    a laser source configured to provide the optical signal to the optical modulator, the optical signal having an optical frequency equal to one of a first optical frequency minus the predetermined frequency and the first optical frequency plus the predetermined frequency; and
    a tunable laser source configured to provide the other optical signal as the tunable optical signal having an optical frequency equal to either a sum of the first optical frequency and the RF signal frequency or a difference of the first optical frequency and the RF signal frequency.

4. The tracking frequency converter of claim 1, further comprising an optical signal-based RF source configured to provide the RF signal, the optical signal-based RF source comprising:
    a first laser source configured to provide a first optical signal having a first optical frequency;
    a tunable second laser source configured to provide a tunable second optical signal having a second optical frequency that is tunable;
    a second square-law photodetector configured to generate the RF signal, the frequency of the generated RF signal being equal to a frequency difference between the first optical frequency and the tunable second optical frequency; and an optical wavemeter configured to determine the frequency difference between the first optical frequency and the tunable second optical frequency, wherein the determined frequency difference provides a measurement of the RF signal frequency.

5. A network analyzer comprising the tracking frequency converter of claim 1, the network analyzer being configured to apply the RF signal to a device under test (DUT), the tracking frequency converter being configured to convert one or both of the RF signal applied to DUT and a response signal received from the DUT into the IF output signal.

6. The tracking frequency converter of claim 4, wherein the optical wavemeter comprises:

an optical interferometer configured to receive a pair of optical signals comprising the first optical signal combined with the tunable second optical signal; and a power meter configured to receive outputs from the optical interferometer and to determine the frequency difference between the first optical frequency and the tunable second optical frequency of the received pair of optical signals from optical power measurements of the received optical interferometer outputs.

7. The tracking frequency converter of claim 4, further comprising an optical frequency shifter configured to apply a predetermined frequency shift to one or both of the first optical signal and the tunable second optical signal of the optical signal-based RF source to provide a frequency-shifted pair of optical signals, a frequency difference between the frequency-shifted pair of optical signals being equal to one of a sum of the RF signal frequency and the predetermined frequency of the IF output signal and a difference between the RF signal frequency and the predetermined frequency of the IF output signal, wherein one of the optical signals of the frequency-shifted pair is the modulated optical signal and another optical signal of the frequency-shifted pair is the other optical signal that together are configured to be received by the first square-law photodetector to convert the RF signal into the IF output signal.

8. The tracking frequency converter of claim 4, further comprising a third laser source that is frequency-offset locked to the first laser source to provide a third optical signal, the third optical signal being a frequency-shifted version of the first optical signal, the frequency-offset lock being configured to provide a predetermined frequency shift to the third optical signal relative to the first optical signal, the predetermined frequency shift being equal to the predetermined frequency of the IF output signal, wherein the third optical signal is the modulated optical signal and the tunable second optical signal is the other optical signal, the modulated third optical signal and the tunable second optical signal are to be received by the first square-law photodetector to provide the IF output signal.

9. The tracking frequency converter of claim 6, wherein the optical wavemeter further comprises:

an absorption cell configured to receive the pair of optical signals, the power meter being further configured to receive an output from the absorption cell and to determine an absolute frequency of one or both of the optical signals of the received optical signal pair from the received absorption cell output.

10. The tracking frequency converter of claim 7, wherein the optical frequency shifter comprises one or both of a nested Mach-Zehnder frequency shifter and an acousto-optic frequency shifter.

11. A network analyzer employing optical modulation-based tracking frequency conversion, the network analyzer comprising:

a radio frequency (RF) signal source configured to generate an RF test signal, the RF test signal to be applied to a port of a device under test (DUT);

an optical local oscillator (LO) source configured to provide a pair of optical signals that is configured to track a frequency of the RF test signal, the optical signals of the pair having a frequency difference equal to either a sum of the RF test signal frequency and a frequency of an intermediate frequency (IF) signal and a difference between the RF test signal frequency and the frequency of the intermediate frequency (IF) signal; and an optical modulation-based frequency converter configured to modulate an optical signal of the optical signal pair according to a received RF signal and to convert the received RF signal into the IF signal using the optical signal pair having the modulated optical signal, wherein the received RF signal comprises one or both of the RF test signal applied to the DUT and a response signal produced by the DUT.

12. The network analyzer of claim 11, wherein the RF signal source comprises:

a first laser source configured to provide a first optical signal having a first optical frequency;

a tunable second laser source configured to provide a tunable second optical signal having a second optical frequency that is tunable;

a square-law photodetector configured to provide the RF test signal, the RF test signal frequency being equal to a frequency difference between the first optical frequency and the tunable second optical frequency; and an optical wavemeter configured to determine the RF test signal frequency from one or both of the first optical frequency and the tunable second optical frequency.

13. The network analyzer of claim 11, wherein the optical modulation-based frequency converter comprises:

an optical modulator configured to modulate the optical signal of the optical signal pair according to the received RF signal; and a square-law photodetector configured to provide the IF signal having a frequency that is a frequency difference between a spectral component of the modulated optical signal and another optical signal of the optical signal pair.

14. The network analyzer of claim 12, wherein the optical LO source comprises an optical frequency shifter configured to apply a predetermined frequency shift to the first optical signal of the first laser source, the frequency-shifted first optical signal being one of the optical signals of the provided pair of optical signals, the predetermined frequency shift being equal to the intermediate frequency, the provided optical signal pair being used by the optical modulation-based frequency converter to convert the received RF signal into the IF signal.

15. The network analyzer of claim 12, wherein the optical LO source comprises a frequency-offset locked third laser source that is frequency-offset locked to the first laser source, the frequency-offset locked third laser source being configured to provide a third optical signal that is a frequency-shifted version of the first optical signal, the frequency-offset lock of the third laser source being configured to provide a predetermined frequency shift to the third optical signal relative to the first optical frequency, the predetermined frequency shift being equal to the IF signal frequency, wherein the third optical signal and the tunable second optical signal are the optical signals of the optical signal pair provided by the optical LO source that are to be used by the optical modulation-based frequency converter to convert the received RF signal into the IF signal.

16. The network analyzer of claim 13, wherein the optical modulator comprises a directional optical modulator, the optical modulator being further configured to separate the RF test signal applied to the DUT port from the response signal produced by the DUT and to selectively employ one of the applied RF test signal and the response signal as the received RF signal to modulate the optical signal of the optical signal pair.

17. The network analyzer of claim 14, wherein the optical frequency shifter is connected between the first laser source of the RF signal source and an optical input of an optical modulator of the optical modulation-based frequency converter.

18. A method of tracking frequency conversion using optical modulation, the method comprising:
    modulating an optical signal according to a received radio frequency (RF) signal using an optical modulator; and
    generating an intermediate frequency (IF) output signal from the modulated optical signal and another optical signal using a square-law photodetector, a frequency difference between a spectral component of the modulated optical signal and the other optical signal being equal to an intermediate frequency of the IF output signal, one or both of the modulated optical signal and the other optical signal being tunable,
    wherein the IF output signal generation comprises a frequency conversion of the received RF signal into the IF output signal.

19. The method of tracking frequency conversion of claim 18, further comprising:
    producing the optical signal using a laser source prior to modulating, the optical signal having an optical frequency equal to either a first optical frequency minus the intermediate frequency or the first optical frequency plus the intermediate frequency; and
    producing the other optical signal using a tunable second laser source, the other optical signal having a tunable optical frequency equal to either a sum of the first optical frequency and a frequency of the received RF signal or a difference of the first optical frequency and the frequency of the received RF signal.

20. The method of tracking frequency conversion of claim 18, further comprising:
    applying an RF test signal to a port of a device under test (DUT); and
    receiving one of the applied RF test signal and a response signal produced by the DUT as the received RF signal used in modulating the optical signal,
    wherein receiving a respective one of the applied RF test signal and the response signal comprises separating the applied RF test signal and the response signal from one another either using a directional coupler or using the optical modulator comprising a directional optical modulator.

* * * * *